(12) United States Patent
Bauer

(10) Patent No.: US 10,752,060 B2
(45) Date of Patent: Aug. 25, 2020

(54) PNEUMATIC VEHICLE TIRE

(71) Applicant: Continental Reifen Deutschland GmbH, Hannover (DE)

(72) Inventor: Wilhelm Bauer, Neustadt a. Rbg. (DE)

(73) Assignee: Continental Reifen Deutschland GmbH, Hannover (DE)

(*) Notice: Subject to any disclaimer, the term of this patent is extended or adjusted under 35 U.S.C. 154(b) by 377 days.

(21) Appl. No.: 15/829,553

(22) Filed: Dec. 1, 2017

(65) Prior Publication Data

US 2018/0086158 A1 Mar. 29, 2018

Related U.S. Application Data

(63) Continuation of application No. PCT/EP2016/052325, filed on Feb. 4, 2016.

(30) Foreign Application Priority Data

Jun. 1, 2015 (DE) .................. 10 2015 210 039

(51) Int. Cl.
*B60C 19/12* (2006.01)
*B60C 19/00* (2006.01)

(52) U.S. Cl.
CPC .......... *B60C 19/002* (2013.01); *B60C 19/122* (2013.01)

(58) Field of Classification Search
CPC ....... B60C 5/002; B60C 19/002; B60C 19/12; B60C 19/122
See application file for complete search history.

(56) References Cited

U.S. PATENT DOCUMENTS

| 5,237,355 A * | 8/1993 | Kiehne | G03B 21/132 353/120 |
|---|---|---|---|
| 6,726,289 B2 * | 4/2004 | Yukawa | B60B 3/04 152/153 |
| 2005/0098251 A1 * | 5/2005 | Yukawa | B60C 19/002 152/450 |
| 2009/0277549 A1 | 11/2009 | Tanno | |
| 2009/0277553 A1 | 11/2009 | Tanno et al. | |
| 2010/0307655 A1 | 12/2010 | Tanno | |
| 2012/0073717 A1 | 3/2012 | Agostini et al. | |
| 2013/0048180 A1 | 2/2013 | Song | |

FOREIGN PATENT DOCUMENTS

| DE | 102007028932 A1 | 12/2008 |
|---|---|---|
| EP | 2006125 A1 | 12/2008 |
| JP | 2005104314 A | 4/2005 |
| JP | 2006335208 A | 12/2006 |
| JP | 2011020479 A | 2/2011 |

OTHER PUBLICATIONS

English translation of International Search Report dated May 6, 2016 of international application PCT/EP2016/052325 on which this application is based.

* cited by examiner

*Primary Examiner* — Justin R Fischer
(74) *Attorney, Agent, or Firm* — David L. Cate; Gregory Adams

(57) ABSTRACT

The invention is directed to a pneumatic vehicle tire with a foam sound absorber therewithin and adhesively attached to the inner side opposite from the tread. The sound absorber has a contact side, by which it adheres to a previously applied, self-sealing sealant. The sealant has a tackiness required for the adhesive attachment of the sound absorber. The contact side of the sound absorber has a contact area on the sealant of between 5% and 50% with respect to the total area of the contact side.

10 Claims, 2 Drawing Sheets

PNEUMATIC VEHICLE TIRE

CROSS REFERENCE TO RELATED APPLICATIONS

This application is a continuation application of international patent application PCT/EP2016/052325, filed Feb. 4, 2016, designating the United States and claiming priority from German application 10 2015 210 039.1, filed Jun. 1, 2015, and the entire content of both applications is incorporated herein by reference.

FIELD OF THE INVENTION

The invention relates to a pneumatic vehicle tire with a foam sound absorber inside it, adhesively attached to the inner surface opposite from the tread, the sound absorber having a contact side, by which it adheres to a previously applied, self-sealing sealant, and the sealant having at least immediately after its application a tackiness required for the adhesive attachment of the sound absorber.

BACKGROUND OF THE INVENTION

Such a pneumatic vehicle tire is known from DE 10 2007 028 932 A1. The sound absorber, also known as an inner absorber, is a ring composed of open-cell foam which reduces the vibration of air in the tire and leads to an improvement in the noise conditions in the vehicle. The high-viscosity sealant applied to the inner side of the tire has two functions. First, the sealant seals an undesired puncture of the tire in the region of the tread, in that in the event of damage to the inner layer, the viscous sealant flows into the location of the damage. Second, the sealant serves at the same time as a "bonding agent" for securing the sound-absorbing foam ring.

However, the flow characteristics of the high-viscosity sealant may be adversely affected by the inner absorber lying on the sealant over its full surface area, meaning that the desired sealing effect only occurs after a delay or not at all. In cases in which the penetrating foreign body comes out of the tire again and leaves a large air channel, reliable sealing by the sealant adversely affected in terms of its flow characteristics is particularly difficult, especially at low temperatures.

SUMMARY OF THE INVENTION

It is an object of the invention to improve the sealing of the tire in the event of punctures, along with at least equally good sound absorption.

The above object is achieved according to the invention by the contact side of the sound absorber having a contact area on the sealant that takes up between 5% and 50% with respect to the total area of the contact side.

According to the invention, the sound absorber is formed and arranged inside the tire in the form of a circular ring. The fact that the sound absorber is not adhesively attached to the sealant over the full surface area but only the contact area, which takes up a much smaller area than the total area of the contact side, means that a considerable free surface area of the sealant is created. As a result, the flow characteristics of the sealant in cases of puncture, and consequently the sealing of the tire, are improved. The probability of a perforation/puncture lying within the contact area of the sound absorber is also reduced, thereby likewise improving sealing.

In spite of the reduced contact area, it is still large enough to provide great resistance to the centrifugal forces occurring when driving at high speed.

In this case, the sound absorber may be a closed or open ring. "Open" means here that the ring is not closed in the form of a circular ring, but has two ends between which a gap is formed.

"Contact side" means that side of the sound absorber that is facing the sealant.

"Contact area" means that area of the contact side that comes directly into (adhesively bonding) contact with the sealant.

"Total area of the contact side" means that area that would be covered if a planar body with outer edges of the same length were to lie on the sealant.

The sealant layer is arranged in the form of a circular ring on the inner side of the tire, under the tread, and has at least such a width that corresponds approximately to the width of the belt plies of the tire.

To improve the sealing further, the contact side of the sound absorber has a contact area on the sealant of between 10% and 40%, preferably between 10% and 30%, with respect to the total area of the contact side. The smaller the contact area is, the better the sealing in cases of puncture. However, the contact area must still be large enough that the sound absorber can be securely fastened on the sealant.

In a preferred configuration of the invention, the sound absorber is a convoluted foam, the contact side of the sound absorber having the convolutions or nubs, the tips of the convolutions lying on the sealant and the convoluted foam preferably having a thickness of 10 mm to 50 mm, with preference of 20 mm to 30 mm. In addition to the improved sealing, here the sound absorption is likewise improved by an increase in the surface area of the sound absorber. Furthermore, the covering of the tacky sealant surface means that soiling effects, such as for example soiling of the rim when the tire is being pulled onto the rim, are reduced.

In another preferred configuration of the invention, the sound absorber is a half tube, the cross section of which is a half circle or a half oval, the walls of the half tube lying on the sealant. Instead of a half tube, two or more half tubes may also be arranged parallel in terms of their longitudinal axis. In addition to the improved sealing, here the sound absorption is likewise improved by an increase in the surface area of the sound absorber. Furthermore, soiling effects, such as for example soiling of the rim when the tire is being pulled onto the rim, are reduced by the covering of the tacky sealant surface.

It is expedient if the sealant is a viscous mixture on the basis of a butyl rubber, a polybutene or on the basis of silicone.

Since the flowability of the sealant is improved by the small contact area of the sound absorber, the layer thickness of the sealant can be reduced and be between 2 mm and 5 mm, preferably approximately 3.5 mm. This saves costs and also tire weight.

In order not to soil the rim with sealant when fitting the tire, it is advantageous if the sound absorber is arranged eccentrically with respect to the zenith of the tire. The sound absorber is preferably arranged displaced in the direction of the outer side of the tire.

As an alternative to the eccentric arrangement of the sound absorber, it may have such a width that corresponds approximately to the width of the sealant. Here, too, the rim is not soiled during fitting of the tire as a result of the sealant being covered by the sound absorber.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
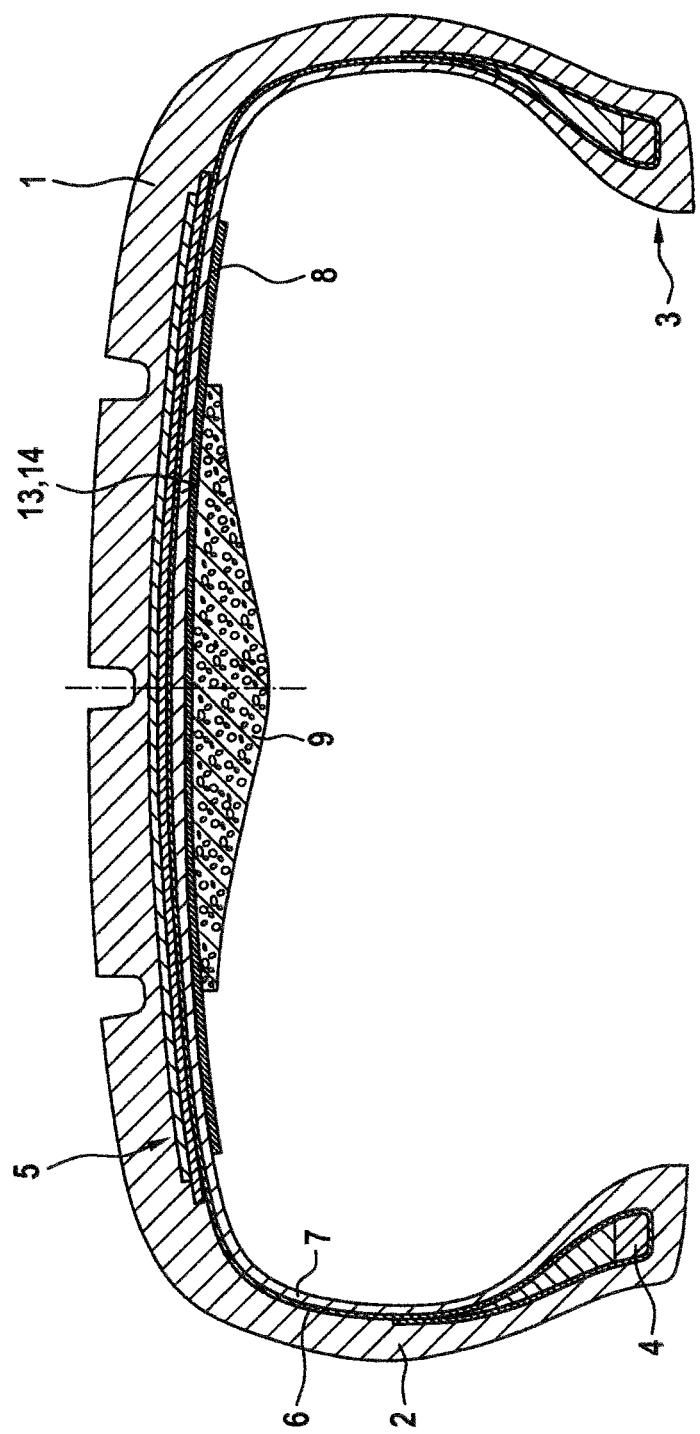
FIG. 1 shows a cross section through a pneumatic vehicle tire of the prior art.

FIG. 1 depicts a cross section through a radial automobile tire having a profiled tread 1, sidewalls 2, bead regions 3, bead cores 4 and also a multi-ply belt assembly 5 and a carcass insert 6. On its inner surface, the tire is covered with an inner layer 7 of an airtight rubber compound. Applied to the inner surface of the inner layer 7, the inner surface being opposite from the tread 1, is a sealant 8 which in the event of puncture—tire damage—is capable of behaving in a self-sealing manner. An inner absorber 9 in the form of a circular ring adheres to the sealant 8 over the full surface area, with the function of a sound absorber, as described below. The sound absorber 9 has a contact side 13. The contact side 13 is that area of the sound absorber that is facing the sealant 8. Because contact is over the full surface area, here the contact side 13 corresponds to the contact area 14. With respect to its sound-absorbing properties, the inner absorber 9 is matched to the tire cavity frequency. The inner absorber 9 has here, for example, an approximately elongated triangular cross section that is symmetrical with respect to the axis of symmetry of the tire—which passes through the zenith of the tire—and adheres on the sealant 8 by its contact side 13 over the full surface area. The foam of the inner absorber 9 is an open-cell foam, since this is best suited to absorbing sound. Possible sealants are, for example, polyurethane gels or viscous mixtures based on butyl rubbers, polybutenes or silicone, it being possible for the mixtures to contain the customary further constituents, such as plasticizer oils. The sealant is introduced, for example by spraying, such that it covers at least the inner surface opposite from the tread 1. The tire can be rotated in order to optimally distribute the sealant on the inner surface. Furthermore, the sealant is introduced in such an amount that the layer thickness of the sealant is between 7 mm and 8 mm. The prefabricated inner absorber 9 is introduced into the interior of the tire. After full reaction, the inner absorber 9 adheres to the sealant 8, which is elastically deformable, but remains immobile to a very great extent.

Figure 2:
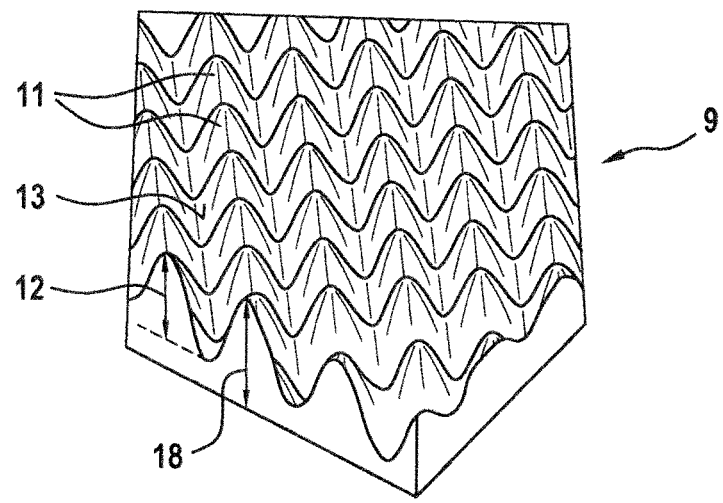
FIG. 2 shows a perspective view of a portion of a sound absorber that can be used in a pneumatic vehicle tire according to the invention; and, FIG. 3 shows a perspective view of a portion of a further sound absorber that can be used in a pneumatic vehicle tire according to the invention.

FIG. 2 shows a perspective view of a portion of a sound absorber 9 of open-cell foam that can be used in a pneumatic vehicle tire according to the invention for automobiles, for example of the size 235/40 R 18.

The sound absorber 9 is comprised of a convoluted foam, the contact side 13 of the sound absorber 9 having the convolutions or nubs 11. The sound absorber 9 lies with the tips of the convolutions 11 in an adhering manner on the sealant (not depicted). The surface area opposite from the contact side 13 may in this case be planar and smooth or likewise have a structure for improved sound absorption. Only the tips of the convolutions 11 lie on the sealant, so that the contact area on the sealant comprises between 5% and 50% with respect to the total area of the contact side 13. All of the convolutions 11 have approximately the same height 12. The convoluted foam has a thickness 18 of approximately 30 mm, measured at the thickest point of the convoluted foam.

Figure 3:
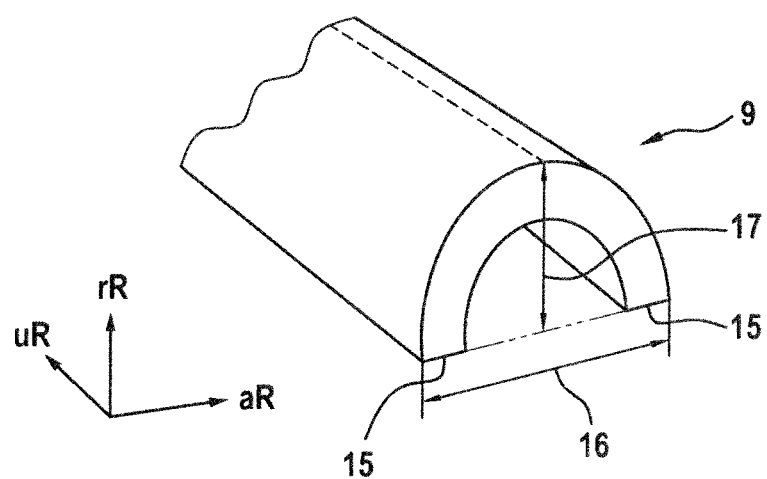

FIG. 3 shows a perspective view of a portion of a further sound absorber 9 that can be used in a pneumatic vehicle tire according to the invention. The sound absorber 9 consists of a half tube or two half tubes placed next to one another (not depicted), the cross sections of which are half circles. The walls 15 of the half tube/half tubes lie on the sealant (not depicted). The sound absorber 9 is arranged in the tire in such a way that the longitudinal axis of the half tube/half tubes (dashed line) is arranged parallel to the circumferential direction of the tire. For the tire size 235/40 R 18, the sound absorber 9 has a width 16 of 120 mm, the width being measured from outer surface to outer surface, parallel to the axial direction aR and at the widest point.

The sound absorber 9 has a height 17 of 60 mm in the case of a single half tube and 30 mm in the case of two half tubes lying next to one another, the height being measured parallel to the radial direction rR and at the highest point.

It is understood that the foregoing description is that of the preferred embodiments of the invention and that various changes and modifications may be made thereto without departing from the spirit and scope of the invention as defined in the appended claims.

LIST OF REFERENCE SIGNS

1 Tread
2 Sidewall
3 Bead region
4 Bead core
5 Belt assembly
6 Carcass insert
7 Inner layer
8 Sealant layer
9 Inner absorber/sound absorber
10 Sound absorber body
11 Convolution
12 Height of the convolution
13 Contact side
14 Contact area
15 Wall
16 Width of the sound absorber
17 Height of the sound absorber
18 Thickness of the sound absorber
aR Axial direction
rR Radial direction
uR Circumferential direction

What is claimed is:

1. A pneumatic vehicle tire comprising:
   a tread;
   an inner side lying opposite said tread;
   a sound absorber having a contact side and being adheredly applied to said inner side;
   said inner side and said contact side conjointly defining an interface;
   a self-sealing sealant applied in advance at said interface so as to permit said sound absorber to adhere with said contact side to said sealant;
   said sealant having a tackiness required for adhesively attaching said sound absorber at least directly after being applied at said interface; and, said contact side of said sound absorber having a contact area lying in a range of 5% to 50% referred to the total area of said contact side;

wherein said sound absorber is a convoluted foam with said contact side thereof being formed with nubs having respective nub tips lying upon said sealant; and, wherein only the nub tips lie on the sealant.

2. The pneumatic vehicle tire of claim 1, wherein said contact side of said sound absorber has a contact area on said sealant lying in a range between 10% and 40% with reference to the total area of said contact side.

3. The pneumatic vehicle tire of claim 1, wherein said contact side of said sound absorber has a contact area on said sealant lying in a range between 20% and 30% with reference to the total area of said contact side.

4. The pneumatic vehicle tire of claim 1, said convoluted foam having a thickness lying in a range of 10 mm to 50 mm.

5. The pneumatic vehicle tire of claim 1, said convoluted foam having a thickness lying in a range of 20 mm to 30 mm.

6. The pneumatic vehicle tire of claim 1, wherein said sealant is a viscous mixture based on a butyl rubber, a polybutene or on the basis of silicone.

7. The pneumatic vehicle tire of claim 1, wherein said sealant has a layer thickness lying in a range of 2 mm and 5 mm.

8. The pneumatic vehicle tire of claim 1, wherein said sealant has a layer thickness lying in a range of 2 mm and 3.5 mm.

9. The pneumatic vehicle tire of claim 1, wherein said tire defines a zenith; and, said sound absorber is arranged eccentrically relative to said zenith of said tire.

10. The pneumatic vehicle tire of claim 1, wherein said sound absorber has a width corresponding to approximately the width of said sealant.

* * * * *